United States Patent

[11] 3,585,795

[72] Inventor Hubert J. Grieb
 Stuttgart-Botnang, Germany
[21] Appl. No. 787,905
[22] Filed Dec. 30, 1968
[45] Patented June 22, 1971
[73] Assignee Daimler-Benz Aktiengesellschaft
 Stuttgart-Unterturkheim, Germany
[32] Priority Dec. 30, 1967
[33] Germany
[31] P1626033.6

[54] GAS TURBINE ASSEMBLY HAVING LOW-PRESSURE GROUPS AND HIGH-PRESSURE GROUPS ADAPTED TO BE SELECTIVELY CONNECTED EITHER IN SERIES OR IN PARALLEL
21 Claims, 17 Drawing Figs.

[52] U.S. Cl................................................ 60/39.16,
 60/39.15, 60/39.17, 60/39.25, 60/39.29, 417/408
[51] Int. Cl....................................................... F02c 1/06,
 F02c 9/02, F02c 3/10
[50] Field of Search............................................ 60/39.29,
 39.25, 39.15, 39.16, 39.17, 39.51; 230/40

[56] References Cited
UNITED STATES PATENTS
2,418,911 4/1947 Smith............................ 60/39.17
2,529,973 11/1950 Sedille et al. ................. 60/39.16
2,580,591 1/1952 Powit............................ 60/39.16 X
2,591,540 4/1952 Grylls............................ 60/39.51 X
2,802,334 8/1957 Fletcher et al.................. 60/39.16
2,895,294 7/1959 Terrell........................... 60/39.16
2,928,242 3/1960 Guenther...................... 60/39.51 X
3,191,707 6/1965 Peterson....................... 60/39.51 X
3,196,611 7/1965 Henny........................... 60/39.16 X
3,104,524 9/1963 Flanders....................... 60/39.16
FOREIGN PATENTS
386,814 3/1931 Great Britain................ 230/40

Primary Examiner—Mark M. Newman
Assistant Examiner—Ronald B. Cox
Attorney—Craig, Antonelli, Stewart & Hill ABSTRACT: A gas turbine installation which includes a combustion chamber, a compressor unit supplying the combustion chamber and having a low-pressure compressor and a high-pressure compressor, a drive turbine unit driven by the combustion gases and driving the compressor unit, and an output engine driven by the combustion gases, in particular an output turbine, whereby the low-pressure compressor and high-pressure compressor are adapted to be connected either in series or in parallel.

INVENTOR
HUBERT J. GRIEB

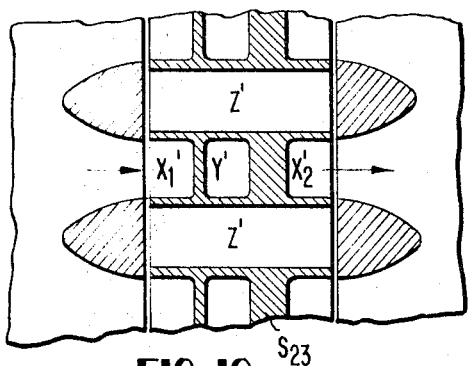
FIG. 10
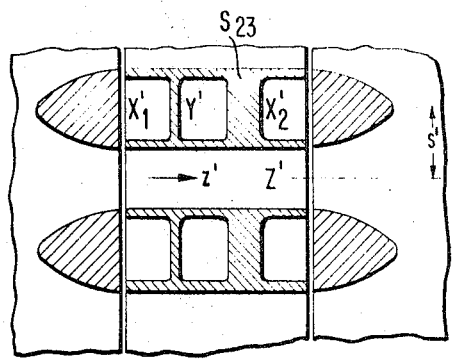
FIG. 11
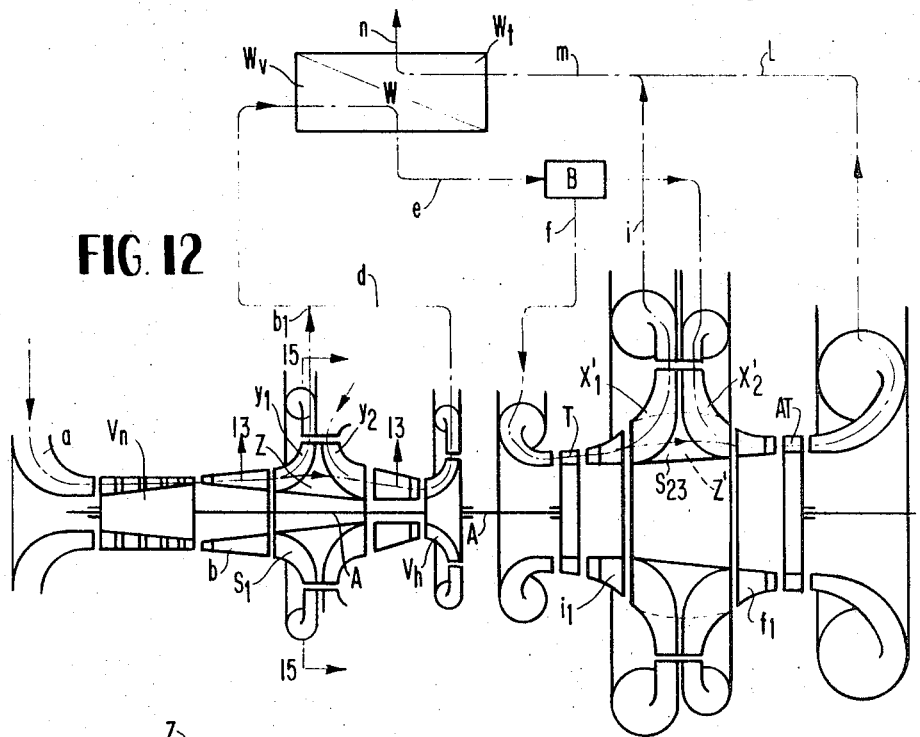
FIG. 12
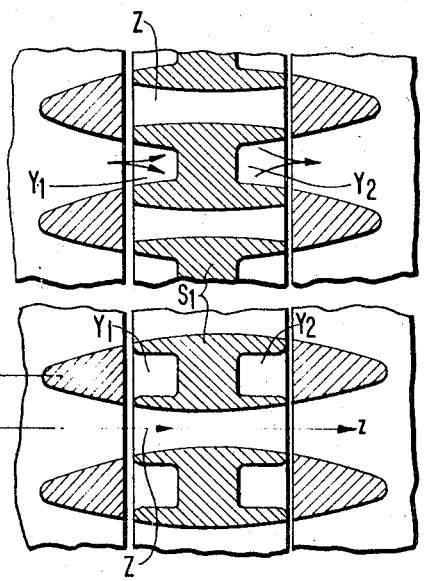
FIG. 13
FIG. 14
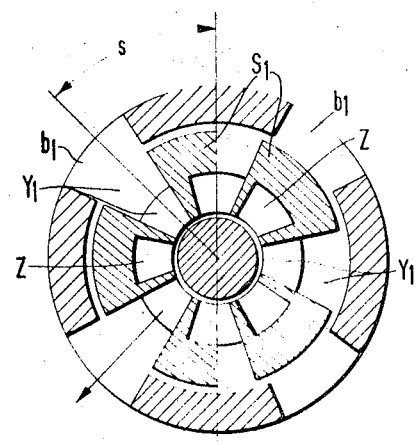
FIG. 15

INVENTOR
HUBERT J. GRIEB

GAS TURBINE ASSEMBLY HAVING LOW-PRESSURE GROUPS AND HIGH-PRESSURE GROUPS ADAPTED TO BE SELECTIVELY CONNECTED EITHER IN SERIES OR IN PARALLEL

The present invention relates to a gas turbine installation having a combustion chamber, a compressor unit supplying the combustion chamber and having a low-pressure compressor and a high-pressure compressor, a compressor drive unit driven by the combustion gases and driving the compressor unit, especially a compressor drive turbine, and a work or output turbine also driven by the combustion gases or any other output unit, and aims above all at the particularly advantageous operation behavior of the installation.

The requirements to be made of a gas turbine, especially of a vehicle gas turbine, are essentially the following:

1. A low specific fuel consumption in the entire operating range, above all, however, within the operating range in which the vehicle is driven most frequently;
2. a low fuel consumption in the idling speed;
3. a favorable torque characteristic;
4. a high overload capacity, i.e., a large power reserve during heavy loads, especially for mountain drives and acceleration;
5. a high reaction capacity during changes in load;
6. a satIsfactory braking behavior;
7. a high operational safety and simple servicing;
8. a moderate structural expenditure, i.e., low costs as well as small space and weight requirement; and
9. nontoxicity of the exhaust gases, especially also at idling speeds.

The gas turbines used heretofore, which operate under these requirements, i.e., in particular the vehicle gas turbines used to date, fulfill only in part the aforementioned requirements in a satisfactory manner. Insofar as they satISFY some of the requirements, their behavior as regards the other requirements is as a rule inadequate. Above all the difficulty exists to operate satisfactorily also in case of overload, i.e., to develop a sufficient torque with high efficiency without simultaneously neglecting the other requirements, especially a favorable fuel consumption during partial loads. This requirement of a favorable operation both during overloads as also with partial loads would represent a substantial progress above all in heavy duty traffic or truck traffic and would considerably improve the fluidity of the traffic at inclines as well as in critical traffic situations, for example, when driving into main roads, during passing, etc.

The underlying problems are solved according to the present invention in that the low-pressure compressor and the high-pressure compressor are adapted to be alternately and selectively connected either in series or in parallel. It is possible in particular by such an alternate shifting capability to achieve the following operating conditions:

a. With a series connection of the compressor units a favorable fuel consumption can be achieved at reduced rotational speeds and relatively small load or power. This operating condition corresponds in general to the most probably operating range. Preferably the compressor drive turbines are also connected thereby in series with the output turbine. The proposed installation resembles thereby from a thermodynamic point of view, a customary gas turbine with free output or working turbine.

b. By the parallel connection of the compressor units a high rate of airflow of gas flow, especially in an upper rotational speed range, and therewith a high output or power is achievable. For the purpose of assimilation of the absorption capacity of the compressors and turbines, the compressor drive turbine or turbines and the work or output turbine are also preferably connected at the same time parallel. Such a connection is suitable above all for mountain drives and accelerations during the driving operation.

The compressors remain connected in series for the acceleration of the installation in the lower rotational speed range whereas the turbines are connected in parallel. As a result of a far-reaching concentration of the available expansion work or power to the compressor drive turbine by a corresponding adjustment of the turbine cross section a decisive shortening of the acceleration period can be achieved thereby. The adjustability of the turbine cross section is—also during stationary operation—necessary anyhow as will appear more fully hereinafter.

The adjustability is to take place thereby in such a manner that with an increase of the cross section of the compressor turbine (parallel connection) and with a simultaneous decrease of the cross section of the working turbine, an undesired throttling or unthrottling of the compressor or of the compressors is avoided.

The prerequisites for an extremely small idling consumption are given thereby because the idling rotational speed of the installation can be placed very low without regard to the acceleration time.

By the corresponding shifting and connection of the low-pressure and high-pressure compressors and/or of the compressor drive unit and of the output engine or working machine, it is possible to achieve simultaneously that the turbines are not subjected to a thermal overload during the acceleration operation because with a given turbine inlet temperature, the available expansion work can be concentrated on the compressor drive turbine unit. In contradistinction thereto, in the upper rotational speed range the connection of the compressor and turbine acceleration is the same as during stationary operation.

Preferably, i.e., with stationary operation, the shifting devices of the compressor unit and the shifting devices of the compressor drive unit and output engine are so connected with each other that with a series connection of the compressors, the compressor drive unit and output engine are also connected in series and with a parallel connection of the compressors, they are also connected in parallel.

The shifting from series to parallel connection or vice versa may take place manually as the occasion demands. In lieu thereof, the shifting may be provided preferably also automatically in dependence on suitable operating magnitudes, for example, on the occurring torque or on the temperature and/or rotational speed in any conventional known manner. Also the shifting can take place in dependence on the compressor pressure condition in that, for example, upon exceeding a maximum pressure condition in series operation, a shifting is undertaken from series operation to parallel operation.

A particular advantage of the present invention also resides in that in both shifting or connecting conditions, all of the units of the installation can remain in operation. The hot parts thus remain heated through so that no thermal loads occur during the shifting-over.

The turbine units may be constructed as axial or radial turbine units. As a rule, it is appropriate to construct the low-pressure compressor as axial turbine and the high-pressure compressor as radial turbine. Advantageously, the compressor-driving engines and output engine are further operatively connected in a conventional manner by way of overrunning clutches or freewheeling devices which is of advantage in particular for the braking operation of the installation. Also during the braking operation, on the one hand, the two compressors and, on the other, the compressor drive turbine and output turbine can be connected thereby in parallel so that analogously to the normal operation also a large braking power is available. For the further increase in the brake power, the compressor drive turbines as also the output or work turbine are thereby so adjusted that they do not produce a driving torque.

The installation—by the inclusion of the shaft of the output turbine as additional shaft—may be constructed either as two-shafted or three-shafted installation. In the former case, the low-pressure compressor and high-pressure compressor are driven by a common shaft from a common compressor-drive-turbine or turbine-unit. In the latter case the drive of the low-pressure compressor and the drive of the high-pressure compressor take place mutually separate from one another by separate drive turbines with separate drive shafts. Both shafts may thereby be arranged as mutually concentric shafts in that one of the shafts is extended through the other shaft which is constructed hollow, and, for instance, through the units interconnected by means of the hollow shaft. In a spatially and structurally particularly advantageous construction the mutually coordinated compressor and drive units may each form common structural units in that the low-pressure compressor and associated drive turbine and/or high-pressure compressor and associated drive turbine or the respective blades thereof are arranged mutually concentrically and/or combined into a structural unit.

According to a further feature and development of the present invention, a conventional heat exchanger is provided in which the hot exhaust gases downstream of the compressor drive unit and/or output turbine are in heat-exchanging contact with the medium, for example, fresh air to be supplied by the compressor unit to the combustion chamber. In comparison to the customary installations the heat exchanger can be constructed of relatively small dimensions by reason of the favorable operating conditions resulting from the alternate operation, especially in series operation.

In a particularly preferred type of construction of the present invention, rotatable shifting bodies are provided as shifting devices for the selective series and parallel connection of two units which are provided, on the one hand, with pairs of axially radially bent channels and, on the other, with approximately axially extending connecting channels in such a manner that in the one shifting position, in particular for the parallel connection, the curved channels are effective while closing the extending-through connecting channels, and in the other shifting position, especially for series connections, the extending-through connecting channels are effective. Such types of shifting devices enable low aerodynamic losses in both shifting positions. The inflow and outflow conditions of the adjoining compressors and turbines remain approximately axially symmetrical which is important above all for the operation of the compressors. During the shifting operation practically only frictional forces and slight inertia forces have to be overcome because the shifting devices during the shifting operation have to be rotated only through small angular values. The shifting elements may also be constructed favorably from an aerodynamic point of view as well as constructively in a simple and operationally reliable manner. All seals can be constructed as contact seals with the corresponding low leakage losses.

The shifting devices on the turbine side may under certain circumstances be appropriately provided with a cooling system for the control of the thermal loads and expansions. For this purpose, for example, the channels may be embedded loosely in a support body whose hollow spaces are traversed by a cooling medium such as cooling air or the like. The cooling medium thereby protects, on the one hand, the support body and, on the other, the sealing places at which, for example, the cooling medium flows back into the gas turbine process. The thermodynamic losses can be kept particularly low as a result thereof.

Additionally, a cooling system of the compressor drive turbine or turbines and of the output turbine may be provided, for example, also in such a manner that the same becomes effective only or primarily only in parallel operation. The arrangement may thereby also be made in such a manner that such a cooling system becomes automatically operative as a result of the position of the shifting elements provided on the turbine and compressor side in the parallel operation and of the pressures which establish themselves thereby.

Of the two mentioned types of constructions with two-shafted and three-shafted construction, above all the two-shafted construction offers special advantages. Thus, with the three-shaft type of construction, two compressor drive turbines are necessary. Additionally, as a rule the drive turbine of the low-pressure and of the high-pressure compressor as well as the output turbine have to be constructed adjustable by reason of the differing conditions during series and parallel connection which are also different during stationary operation. The mechanically independent compressor drive turbines entail under certain circumstances stability problems during the shifting or during rapid load change in the parallel operation of the three-shafted type of construction. Additionally, under certain circumstances difficulties may result as regards the shifting elements by reason of the vicinity of hot and cold parts as well as regards the channel guidance by reason of the mutual penetration of the channels on the compressor and turbine sides in the shifting elements. On the other hand, an aerodynamically favorable type of construction, especially of the compressor drive turbines can be achieved.

In contradistinction thereto, the two-shafted type of construction of the installation represents a substantial simplification because only one compressor drive turbine is necessary. In principle, an adjustability of the compressor drive and output turbine is necessary also in that case as also with the three-shafted type of construction, also during the stationary operation.

As with the three-shafted type of construction, an additional considerable improvement of the reaction capacity is at the same time possible with load changes. The high braking power can be realized in a considerably more simple manner compared with the three-shafted arrangement because with the two-shaft arrangement as a rule only one free wheeling device is necessary. The shifting elements furthermore permit with the two-shaft construction a constructively particularly simple and favorable channel guidance and enable in both shifting positions considerably smaller aerodynamic overall losses than with the three-shaft type of construction.

Particular advantages can be achieved by the present invention also from a thermodynamic point of view. In the parallel operation a considerable output increase can be achieved without larger temperature increase.

Even through the construction of all of the operating units (compressor, compressor drive unit, and working or output engine) as turbounits is of particular advantage, the present invention can also be realized if one or the other units is not constructed as turbounit. For example, the utilization of the exhaust gas energy may take place, instead of in an output turbine, also in some other type of output engine or also in any other known manner. Moreover, for the individual units of the compressor or drive units, units other than turbine units may be provided.

These and further objects, features, and advantages of the present invention will become more obvious from the following description when taken in connection with the accompanying drawings which show, for purposes of illustration only, several embodiments in accordance with the present invention and wherein:

FIG. 10 is a cross-sectional view taken along line 10-10 of FIG. 5;

FIG. 11 is a cross-sectional view similar to FIG. 10, however with a series connection;

FIG. 12 is a schematic elevational view of a two-shaft turbine installation in accordance with the present invention;

FIG. 13 is a cross-sectional view taken along line 13-13 of FIG. 12, and more particularly with a parallel connection;

FIG. 14 is a cross-sectional view, similar to FIG. 13, however with a series connection;

FIG. 15 is a cross-sectional view taken along line 15-15 of FIG. 12, and more particularly in the left half with a parallel connection and in the right half with a series connection whereby FIGS. 13 to 15 are shown on an enlarged scale;

Figure 1:
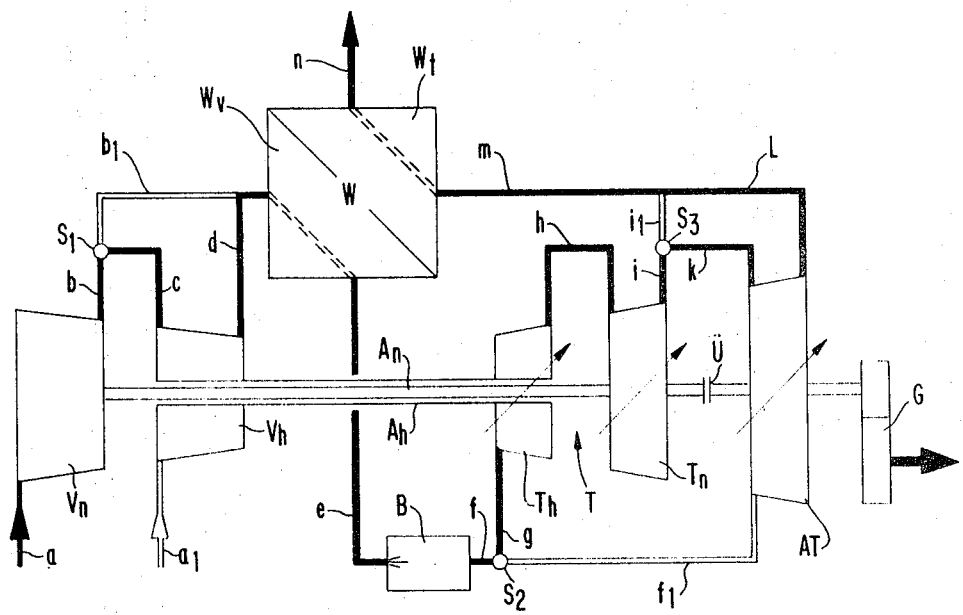
FIG. 1 is a schematic connecting diagram of a three-shaft type of construction in accordance with the present invention in series connection.

Referring now to the drawings, wherein like reference numerals are used throughout the various views to designate like parts, reference character $V_n$ designates in all figures a low-pressure compressor, reference character $V_h$ a high-pressure compressor, reference character T a compressor drive turbine, reference character $T_n$ a low-pressure compressor drive turbine and reference character $T_h$ a high-pressure compressor drive turbine while reference character AT designates an output or work turbine, reference character G a transmission connected in the output of the work turbine, reference character W a heat exhanger, reference character B a combustion chamber, reference characters $S_1$ or $S_2$, $S_3$ shifting elements and reference character Ü an overrunning clutch.

Figure 2:
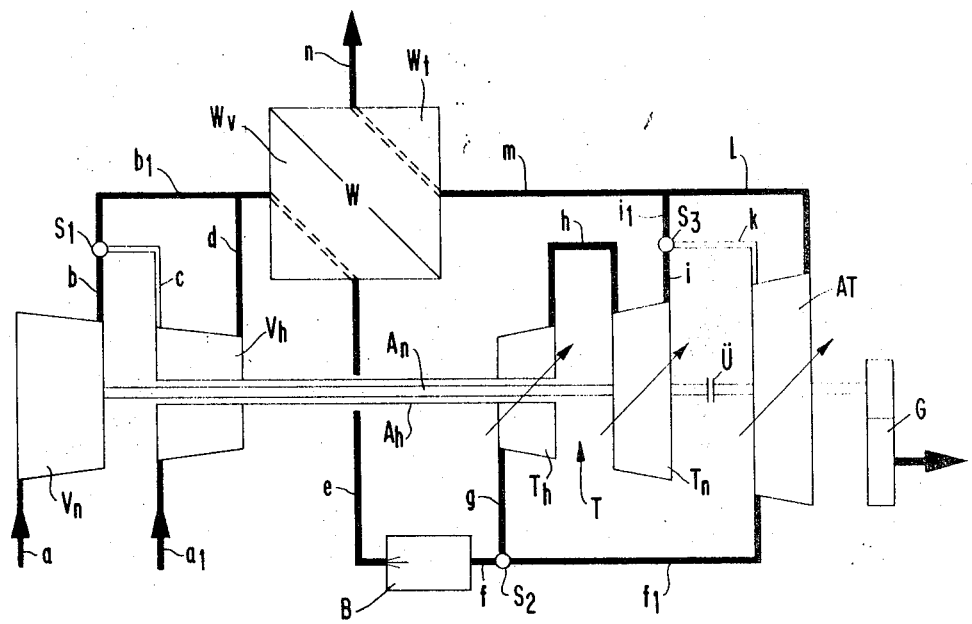
FIG. 2 is a schematic connecting diagram of the three-shaft type of construction of FIG. 1, in parallel connection.
Figure 3:
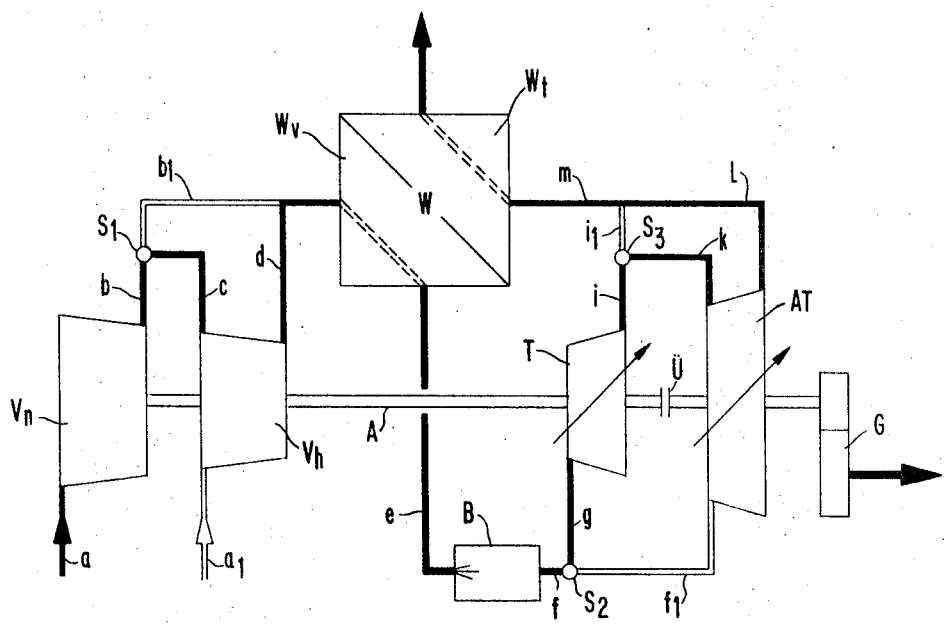
FIG. 3 is a schematic connecting diagram of a two-shaft type of construction, in series in connection.
Figure 4:
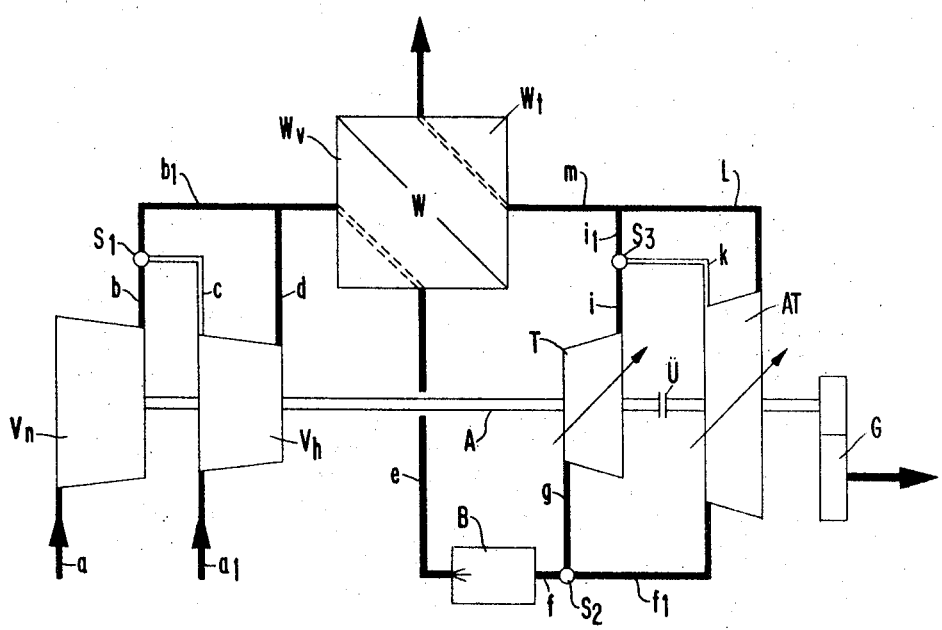
FIG. 4 is a schematic connecting diagram of the two-shaft type of construction of FIG. 3, in parallel connection.
Figure 5:
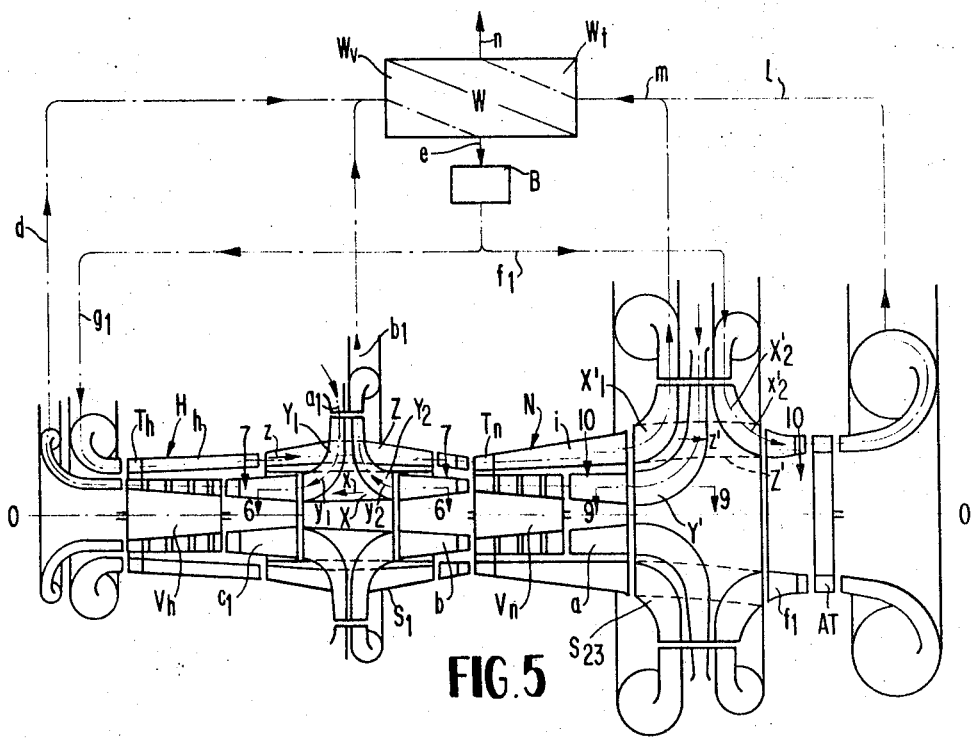
FIG. 5 is a schematic elevational view of a three-shaft turbine installation in accordance with the present invention.
Figure 6:
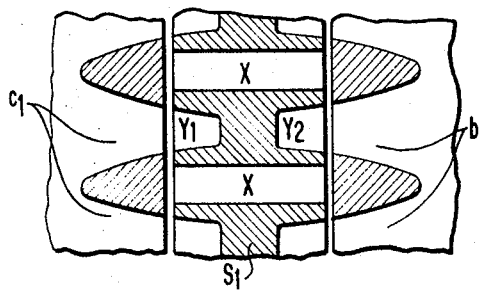
FIG. 6 is a cross-sectional view, on an enlarged scale through the shifting element taken along line 6–6 of FIG. 5, and more particularly with a parallel connection.
Figure 8:
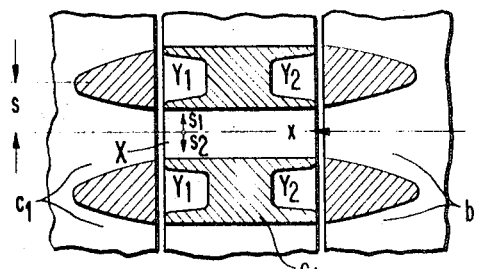
FIG. 8 is a cross-sectional view, similar to FIG. 6, however with a series connection.
Figure 7:
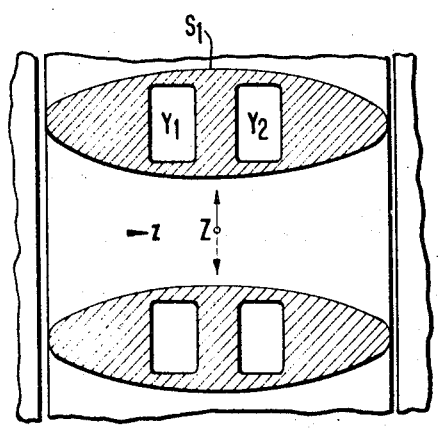
FIG. 7 is a cross-sectional view taken along line 7–7 of FIG. 5.
Figure 9:
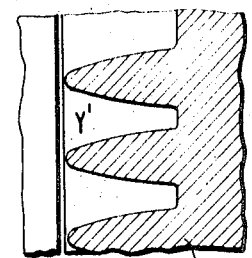
FIG. 9 is a cross-sectional view taken along line 9-9 of FIG. 5.

In the three-shaft arrangement according to FIGS. 1 and 2, the low-pressure compressor $V_n$ is connected with the low-pressure compressor drive turbine $T_n$ by an inner drive shaft $A_n$, the high-pressure compressor $V_h$ with the high-pressure compressor drive turbine $T_h$ by an outer hollow shaft $A_h$ surrounding the shaft $A_n$ whereby the high-pressure units $V_h$ and $T_h$ are arranged axially between the low-pressure units $V_n$ and $T_n$.

In the series connection according to FIG. 1, the medium supplied through the line a is conducted by way of the low-pressure compressor $V_n$, by way of the lines b and c connected by the shifting element $S_1$ as well as by way of the high-pressure compressor $V_h$ and the line d to the compressor side $W_v$ of the heat exchanger W, from where it reaches by way of the line e the combustion chamber B in which the ignition and combustion of the fuel take place. The supplied medium may be therefore, for example, compressed fresh air in that the fuel is injected into the combustion chamber B separately from the medium, or it may be a combustible mixture which is ignited in the combustion chamber B.

From the combustion chamber B the ignited combustion gases which are brought to a high-pressure, now reach by way of the lines f and g connected by the shifting element $S_2$, the high-pressure drive turbine $T_h$, thereupon by way of the line h the low-pressure drive turbine $T_n$ and thereafter by way of the lines i and k connected with each other by the shifting element $S_3$ the output turbine AT, from where the exhaust gases after the performance of their work, reach by way of the line sections l and m, the turbine side $W_t$ of the heat exchanger W, and thereafter are able to flow off by way of the line n. In the heat exchanger W, they give off thereby their residual heat contents as much as possible for the preheating of the compressed medium which flows through the compressor side $W_v$ of the heat exchanger.

The high-pressure compressor drive turbine $T_h$ thereby drives by way of the drive shaft $A_h$, the high-pressure compressor $V_h$ whereas the low-pressure compressor drive turbine $T_n$ drives the low-pressure compressor $V_n$ by way of the shaft $A_n$.

The output or work turbine AT is connected with the low-pressure compressor drive turbine $T_n$ by way of an overrunning clutch Ü and gives off its useful output by way of any desired, conventional change speed transmission G.

The series connection serves in particular for the transmission of small outputs at reduced rotational speeds.

For a larger output with a high rate of flow of the medium to be compressed with simultaneous corresponding absorption capacity of the output engine serves the parallel connection which is illustrated in FIG. 2 for the three-shaft type of construction. In contradistinction to the connection according to FIG. 1, in this case the working medium is supplied both by way of line a to the low-pressure compressor $V_n$ as also by way of line $a_1$ to the high-pressure compressor $V_h$, whereby the conduction to the heat exchanger W takes place, by a corresponding switching of the shifting element $S_1$, mutually parallel by way of lines b, $b_1$, and d. The line c is thereby rendered inoperable.

On the turbine side of the installation, the compressor drive turbines $T_h$ and $T_n$ are again connected in series by way of the line h; however this turbine unit T is connected in parallel to the output turbine AT by a corresponding shifting of the sifting elements $S_2$ and $S_3$ in that the compressor turbine unit T is connected with the heating exchange W by way of the lines g, h, i, $i_1$, and m while the output turbine AT is connected with the heat exhanger W by way of the lines $f_t$, $l$ and m. The connecting line k leading from the compressor turbine unit T to the output turbine AT is rendered inoperative. The compressor drive turbines $T_n$ and $T_h$ and the output turbine AT are constructed preferably as regulatable or adjustable units, for example, with adjustable blades.

The two-shaft type of construction described above in that the low-pressure compressor $V_n$ and the high-pressure compressor $V_h$ are arranged on a common drive shaft A and are driven in common from a single compressor drive turbine T. As to the rest, the connection corresponds to that of the three-shaft construction. An adjustability of the compressor drive turbine T and of the output turbine AT is also necessary as a rule in this embodiment.

In the following figures which schematically illustrate the installation from a structural point of view, the same parts as in FIGS. 1 to 4 are designated by corresponding reference characters. FIGS. 5 to 15 illustrate by the spatial coordination of the individual turbine units as well as of the shifting elements on a common axis, and more particularly FIGS. 5 to 11 for a three-shaft type of construction and FIGS. 12 to 15 for a two-shaft type of construction.

Differing from FIGS. 1 and 2, no concentric arrangement of the connecting shafts is assumed in the type of construction according to FIGS. 5 to 11. Rather, the associated units, i.e., on the one hand, the low-pressure units $V_n$ and $T_n$ and, on the other, the high-pressure units $V_h$ and $T_h$ are combined into an aggregate each, i.e., into the low-pressure unit generally designated by reference character N and into the high-pressure unit generally designated by reference character H, whereby the compressors $V_n$ and $V_h$ form respectively the inner part and the turbine $T_n$ and $T_h$ driving the compressors the part concentric thereto of the units N and H.

The shifting element $S_1$ is arranged concentrically to the axis o-o between the two units N and H has a body of revolution and is rotatable about this axis through a shifting angle stroke s in the direction of arrow $s_1$ and $s_2$, respectively. The shifting element $S_1$ is traversed, on the other hand, by the approximately axial and parallel passing-through channels X and Z as well as by the channels $Y_1$ and $Y_2$ deflecting from a radial into axial direction or vice versa whereby these channels are distributed circumferentially about the axis o-o in the shifting element $S_1$. Depending on the position of the shifting element $S_1$, the channels X or $Y_1Y_2$ are alternately in the operable or effective position whereas the channels Z remain constantly operable or engaged notwithstanding the simultaneous adjustment thereof in the circumferential direction with the shifting of the shifting element. The shifting element $S_{23}$ is constructed in a similar manner which essentially assumes the functions of the shifting elements $S_2$ and $S_3$ illustrated in the FIGS. 1 and 2 and is also rotatable as a body of revolution about the axis $o-o$ through an angular stroke $s'$. It contains the essentially axially and parallelly directed channels $Z'$ as well as the channels $Y'$ and $X_1'$, $X_2'$ bent from the radial into the axial direction or vice versa.

The parallel connection of the installation is assumed in FIGS. 5 to 7, 9, and 10. The connection between the lines $b$ and $c$ (or on this embodiment $c_i$) is interrupted whereas the connection between the line sections $b$ and $b_i$ of the low-pressure compressor is established by way of the channels $Y_2$ and the connection between the line sections $a_i$ and $C_i$ of the high-pressure compressor $V_h$ is established by way of channels $Y_i$. The medium to be compressed is therefore supplied from the low-pressure compressor $V_n$ in the direction of arrow $y_2$ and parallel thereto in the direction of arrow $y_1$ by way of the high-pressure compressor $V_h$ to the heat-exchanger W, from where it reaches the combustion chamber B. From the combustion chamber, the exhaust gases can reach, on the one hand, by way of the line $f_1$ and the channels $X_2'$ of the shifting element $S_{23}$ and the line $m$ the heat exchanger W whereafter they can be conducted off into the atmosphere.

For the operation with series connection, the shifting elements $S_1$ and $S_{23}$ are adjusted in the circumferential direction through the shifting stroke $s$ and $s'$, respectively. The channels in the shifting elements $S_1$ thereby arrive from the position according to FIG. 6 into that according to FIG. 8 and the channels in the shifting elements $S_{23}$ from the position according to FIG. 10 into that according to FIG. 11. The channels X in the shifting elements $S_1$ as well as the channels $Z'$ in the shifting elements $S_{23}$ are thereby opened whereas simultaneously the bent channels $Y_1$, and $Y_2$ in the shifting elements $S_1$ and the channels $X_1'$ and $X_2'$ in the shifting elements $S_{22}$ are closed. The medium to be compressed can thereby flow directly from the low-pressure compressor $V_n$ through the channels X to the high-pressure compressor $V_h$ whereas the combustion gases, after flowing through the compressor turbines $T_h$ and $T_n$, are conducted by way of the channels $Z'$ in series connection to the output turbine AT.

FIGS. 12 to 15 illustrate an arrangement similar to that of FIGS. 5 to 11 for a two-shaft type of construction. The compressors $V_n$ and $V_h$ as well as the drive turbine T of the compressors are connected with each other by common drive shaft A. A shifting element $S_1$ is provided again with approximately axial channels Z and with curved channels $Y_1$, $Y_2$ while the shifting element $S_{23}$ is provided with approximately axial channels $Z'$ and curved channels $X_1'$.

With a parallel connection (FIGS. 12, 13, and 15, left half), the medium streams supplied by the compressors $V_n$, $V_h$, are supplied by way of the curved channels $Y_i$ and $Y_2$ in the shifting elements $S_1$ separately to the heat exchanger W and from there to the combustion B, from where the exhaust gases, with closed channels $Z'$, can reach to the turbine side of the heat exchanger W separately from one another, on the one hand, by way of the compressor drive turbine T and the curved channels $X_1'$ and on the other hand, by way of channels $X_2'$ and the output turbine AT.

In contradistinction thereto, with a series connection, the shifting elements $S_1$ are in the position illustrated in FIG. 14 and in FIG. 15 (right half). The medium supplied by the low-pressure compressor $V_n$ reaches by way of channels Z in the direction of arrow $z$ the high-pressure compressor $V_h$ and from there by way of the heat exchanger W the combustion chamber B from where it is able to reach the compressor drive turbine T and with now closed channels $X_1'$ and $X_2'$, by way of the channels $Z'$ in the shifting element $S_{23}$, the work output turbine AT and from there the heat exchanger W.

Figure 16:
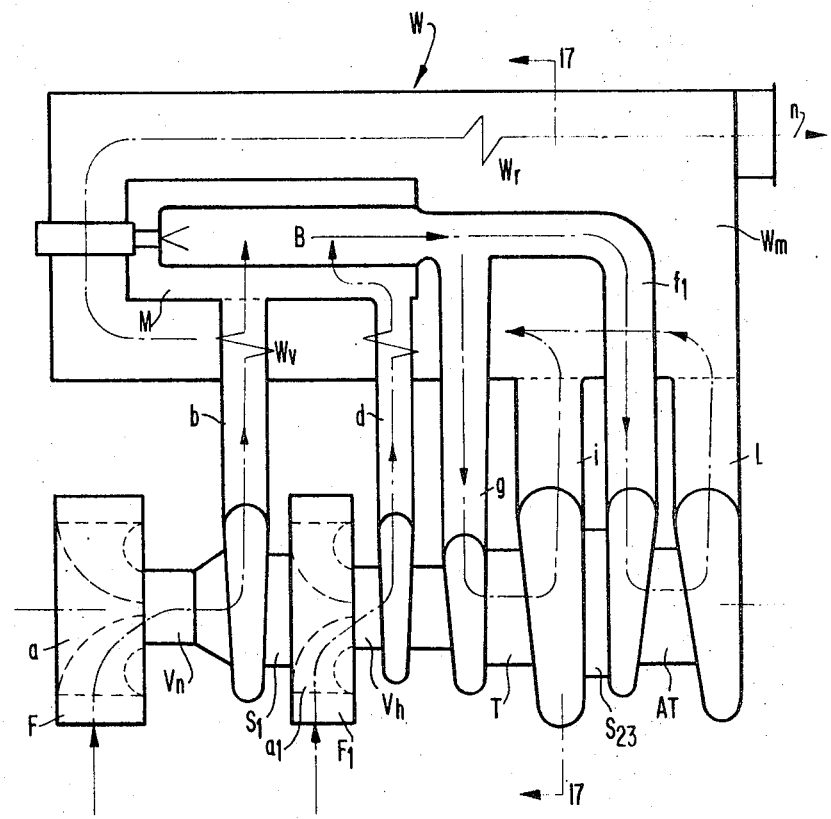
FIG. 16 is a schematic elevational view of the overall installation in accordance with the present invention.
Figure 17:
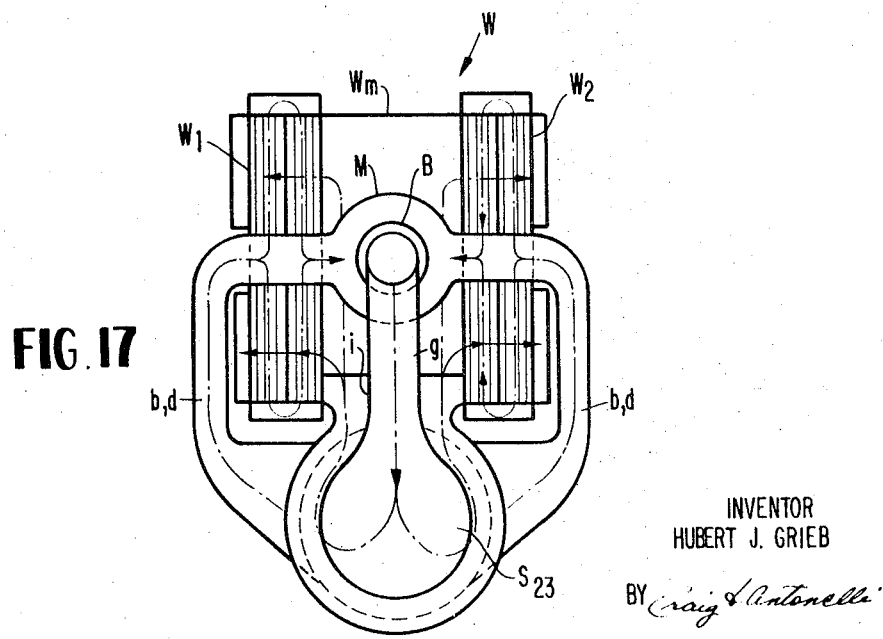
FIG. 17 is a cross-sectional view taken along line 17-17 of FIG. 16.

FIGS. 16 and 17 illustrate schematically a preferred spatial arrangement of the installation in conjunction with the heat exchanger W and the combustion chamber B, whereby a two-shaft type of construction corresponding to FIG. 12 and, more particularly, with a parallel operation is assumed. The fresh air is supplied to the compressors $V_n$ (and with parallel connection $V_h$) by way of a filter F (and with parallel operation by way of a filter $F_1$).

The heat exchanger W is thereby arranged above the engine unit, and more particularly, in two parts $W_1$ and $W_2$ on both sides of the combustion chamber B, to which the fresh air is conducted by way of the lines $b$ and $d$ after flowing through the compressor side of the heat exchanger, by way of a jacket or casing M. The clear, spatial separation of heat exchanger and turbine part is particularly advantageous from an assembly point of view.

The exhaust gases flow directly into a center chamber $W_m$ of the heat exchanger W where, on the one hand, they flow about the casing M of the combustion chamber and, on the other, flow through the heat exchanger halves $W_1$ and $W_1$ for the further transfer of the heat thereof to the fresh air.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A gas turbine unit with a combustion chamber means, a compressor unit supplying the combustion chamber means and having low-pressure compressor means and high-pressure compressor means, compressor drive turbine unit driven by the combustion gases and driving the compressor unit, and an output engine means driven by the combustion gases for conversion into mechanical energy, characterized by means for selectively connecting the low-pressure compressor means and the high-pressure compressor means either in series flow or in parallel flow and means for selectively connecting the drive turbine unit and the output engine means either in series flow of in parallel flow.

2. A gas turbine installation according to claim 1, wherein the output engine means is an output turbine means and the compressor drive unit includes compressor drive turbine means.

3. An installation according to claim 1, wherein, during stationary operation or braking operation with a series flow connection of the compressor means, the compressor drive turbine-unit and output engine means are also connected in series flow, and with a parallel flow connection of the compressor means, the compressor drive turbine unit and the output engine means are also connected in parallel flow and, during acceleration, the compressor drive turbine unit and output engine means are connected in parallel flow.

4. An installation according to claim 1, wherein the low-pressure compressor means, the high-pressure compressor means and the compressor drive unit are connected by a common drive shaft.

5. An installation according to claim 1, wherein the compressor-drive-turbine means includes a low-pressure compressor drive turbine means and a high-pressure compressor drive turbine means, the low-pressure compressor means is connected with the low-pressure compressor drive turbine means and the high-pressure compressor means is connected with the high-pressure compressor drive turbine means each by way of a separate shaft, and the separate shafts are arranged concentrically to each other, the radially outer drive shaft operatively connecting the axially inner units and the radially inner drive shaft connecting the axially outer units.

6. An installation according to claim 1, wherein the compressor drive unit and the output engine means are operatively connected with each other by overrunning clutch means.

7. An installation according to claim 6, wherein the high-pressure compressor means, the low-pressure compressor means, the compressor drive turbine unit, and the output engine means are located coaxially with respect to each other and connected by coaxial shafts, whereby the overrunning clutch means is located directly between the compressor drive turbine unit and the output engine means.

8. A gas turbine unit with a combustion chamber means, a compressor unit supplying the combustion chamber means and having low-pressure compressor means and high-pressure compressor means, compressor drive unit driven by the combustion gases and driving the compressor unit, an output engine means driven by the combustion gases, further means for selectively connecting the low-pressure compressor means and the high-pressure compressor means either in series or in parallel, said further means including shifting means for the compressor unit and shifting means for the compressor drive unit and shifting means for the compressor drive unit which are connected to each other in such manner so that, during stationary operation or braking operation with a series connection of the compressor means, the compressor drive unit and output engine means are also connected in series and, with a parallel connection of the compressor means, the compressor drive unit and the output engine means are also connected in parallel, and that during acceleration, the compressor drive unit and output engine means are connected in parallel, wherein the shifting means for the selective series and a parallel connection are constructed as rotary shifting means provided, on the one hand, with curved channels deflecting from a radial into axial direction, and on the other hand, with approximately axially passing-through connecting channels in such a manner that in the one shifting position, the passing-through connecting channels are closed and the curved channels are in the flow-preventing position, and in the other shifting position, the passing-through connecting channels are in the flow-permitting position.

9. An installation according to claim 8, wherein each rotary shifting means is provided with a pair of curved channels deflecting from a radial into an axial direction.

10. An installation according to claim 9, wherein the curved channels start pairwise from two end faces of the rotary shifting means and run out adjacent to one another approximately radially and parallelly.

11. An installation according to claim 10, wherein alternately curved channels deflecting from a radial into an axial direction and axially passing-through channels follow one another in the circumferential direction, and the shifting stroke corresponds approximately to the angular distance between succeeding curved and axially passing-through channels.

12. An installation according to claim 11, wherein the angular distance is about 45°.

13. An installation according to claim 12, wherein the shifting means on the side of the turbine are provided with cooling means.

14. An installation according to claim 13, further comprising heat exchanger means in which the hot exhaust gases downstream of the compressor drive turbine unit and output engine are in heat transfer contact with the medium supplied from the compressor unit to the combustion chamber means.

15. An installation according to claim 14, wherein the heat exchanger means is arranged on both sides of the combustion chamber means.

16. An installation according to claim 14, wherein the heat exchanger means together with the line system leading from the units to the heat exchanger means is arranged on both sides of the combustion chamber means.

17. An installation according to claim 16, wherein the heat exchanger means is arranged symmetrically to a plane extending through the axis of the engine.

18. An installation according to claim 17, wherein the heat exchanger means and the turbopart are spatially separated from one another.

19. An installation according to claim 8, wherein alternately curved channels deflecting from a radial into an axial direction and axially passing-through channels follow one another in the circumferential direction, and the shifting stroke corresponds approximately to the angular distance between succeeding curved and axially passing-through channels.

20. An installation according to claim 19, wherein the angular distance is about 45°.

21. An installation according to claim 8, wherein the shifting means on the side of the turbine are provided with cooling means.